Figure 1:
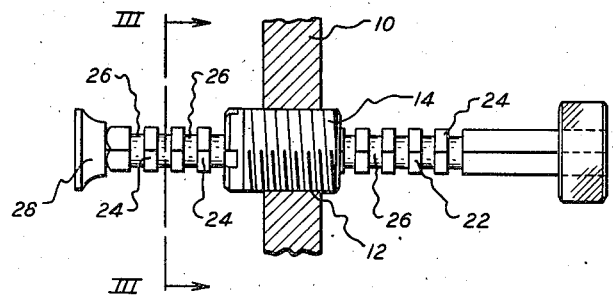

May 27, 1947.    H. H. MERRIMAN    2,421,282

RAPID TRAVERSE PRESSURE UNIT

Filed April 6, 1944

Inventor
HENRY H. MERRIMAN
By Beaman & Langford
Attorney

Patented May 27, 1947

2,421,282

UNITED STATES PATENT OFFICE 2,421,282

RAPID TRAVERSE PRESSURE UNIT

Henry H. Merriman, Jackson, Mich., assignor to Harry D. Boardman, Jackson, Mich., as trustee Application April 6, 1944, Serial No. 529,783

4 Claims. (Cl. 74—424.8)

The present invention relates to improvements in inexpensive, simplified, quick acting pressure devices which may be employed in clamps, jigs, fixtures, vises and the like.

The object of the present invention is to provide a device of the character which may be inexpensively manufactured, comprises a minimum number of parts, avoids close tolerances, and is capable of being manufactured for the most part on automatic equipment.

These and other objects residing in the construction, combination and arrangement of parts will more fully appear from a consideration of the following specification and the appended claims.

Figure 2:
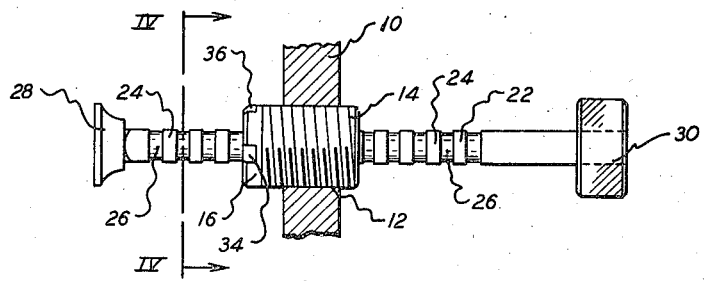
Figure 3:
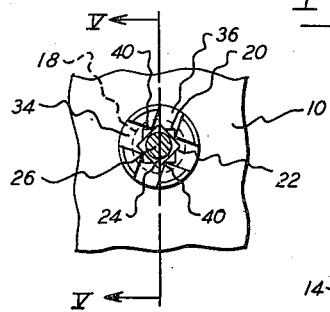
Figure 4:
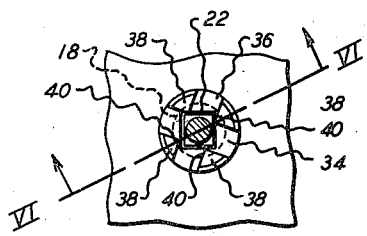
Figure 5:
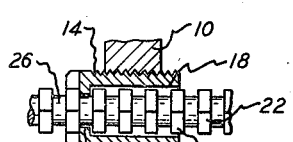
Figure 6:
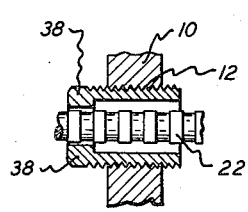

In the drawing, wherein one form of the invention is illustrated,

Fig. 1 is a side elevational view of the associated parts of the device threaded into the member shown in vertical cross section, the device being shown in locked position, Fig. 2 is a view similar to Fig. 1 with the device shown unlocked in a position to be withdrawn, Fig. 3 is a cross-sectional view through the thrust bar taken on line III—III of Fig. 1 and viewed in the direction of the arrow, Fig. 4 is a view similar to Fig. 3 taken on line IV—IV of Fig. 2, Fig. 5 is a cross-sectional view taken on line V—V of Fig. 3, and Fig. 6 is a cross-sectional view taken on line VI—VI of Fig. 4.

Quick acting clamp and pressure applying devices of the general character disclosed are well known and take many forms. Reference may be had to Patents No. 754,962, No. 823,017 and No. 1,045,745 showing disclosure of similar devices.

Referring to the drawing, part 10, which may be part of a vise, clamp, jig, fixture or the like, has an internally threaded bore 12 to receive the externally threaded bearing block 14. Preferably the bearing block 14 has an unthreaded head 16 at one end thereof.

As more clearly shown in Fig. 5, there are two different size cavities within the bearing block 12. In the particular embodiment of the invention illustrated, the cavity 18 may be extended throughout substantially the threaded portion of the thrust block 12, while the cavity 20 is smaller than the cavity 18 and extends through the head 16.

The shape and size of the cavities 18 and 20 depend on the shape and size of the thrust bar 22, and it is to be understood that the form of the thrust bar 22 may be varied. As shown, the bar 22 is made from square bar stock and turned at spaced points along its length to provide alternate square portions 24 and cylindrical portions 26. At one end of the bar 22 is a pressure foot portion 28 and at the opposite end a suitable handle shown in the form of a knob 30.

The head 16 is preferably formed with cross slots 34 and 36 which may be milled or otherwise provided. Between the slots 34 and 36 are abutments 38. From Figs. 3 and 4 it will be noted that the cavity 20 is square to conform to the shape of the bar 22 which slides therein. It will be further noted that the sides of the cavity 20 are angularly disposed to the sides of the slots 34 and 36. By making the slots 34 and 36 of a width approximately the width of the cavity 20 and the bar 22, the corners 40 of the abutments 38 will be extensions of the sides of the cavity 20 and will be located to one side of the midpoint of the sides to permit partial rotation of the bar 22 before the corners of the portion 24 engage the abutments 38.

The operation of the device described is as follows. As shown in Fig. 5, the cavity 18 is preferably drilled to a diameter slightly in excess of the distance across the corners of the square portion 24 to guide the bar 22 for back and forth movement through the cavity 20 with the bar 22 in the aligned or unlocked position shown in Fig. 4. In this position the corners 40 also function as guides to pilot the bar 22 smoothly through the similarly shaped cavity 20. To lock the bar 22 to the bearing block 14 for unitary rotative movement, it is only necessary to partially rotate the bar 22 with any one of the reduced portions 26 in radial alignment with the reduced cavity 20. With the parts so positioned counter-clockwise movement of the bar 22, as viewed in Fig. 4, will result in partial rotation to the locked position shown in Fig. 3. In the locked position axial thrust of the bar 22 is delivered by the radial sides of the corners of the portion 24 to the bottom portion of the slots 34 and 36 overlapped thereby. As shown in Fig. 3, the partial rotation of the bar 22 has been arrested through engagement between the corners 40 of the head 16. Further rotational movement of the bar 22 in the same direction will rotate the thrust block 14, advancing the bar 22 and block 14 as a unit with the mechanical advantage of the screw. For rapid withdrawal of the bar 22 thereafter, rotation of the bar 22 in the opposite direction will bring the portion 24 back into axial alignment with the cavity 20, as shown in Fig. 4, and the bar 22 may be axially slid relative to the bearing block 14.

In this operation the corners 40 function as aligning stops terminating relative rotation and then as guides or pilots for smooth axial movement of the bar 22.

Having thus described my invention what I desire to secure by Letters Patent and claim is:

1. A rapid traverse screw advance pressure unit assembly, comprising an externally threaded thrust collar adapted to be supported in a threaded aperture and having a cylindrical axially extending chamber extending through substantially the entire length of said collar, a transverse wall at one end of said collar and defining one end of said chamber, a noncircular opening defined in said wall of reduced cross section as compared with the cross section of said chamber, a thrust bar having a noncircular portion adapted to be moved axially through said opening and held in one position of axial alignment therewith and having axial and radial clearance with said chamber in all positions of relative rotation and axial movement, a portion of reduced transverse cross section upon said bar adjacent said noncircular portion and having at least partial rotational clearance with said noncircular portion when disposed in the radial plane thereof, said noncircular portion of said bar upon partial rotation of said reduced portion in the plane of said opening overlapping a portion of said wall defining said opening to transfer the thrust of said bar to said collar, an axial projection on said wall adjacent said opening with which said noncircular portion of said bar engages as a stop on partial rotation in one direction to interlock said collar and bar for unitary rotation, and a second axial projection on said wall and engaging said noncircular portion of said bar as a stop upon partial rotation in the opposite direction to axially align said noncircular portion of said bar with said opening for rapid axial traverse of said bar relative to said collar.

2. A rapid traverse screw advance pressure unit assembly, comprising an externally threaded thrust collar adapted to be supported in a threaded aperture and having a cylindrical axially extending chamber extending through substantially the entire length of said collar, a transverse wall at one end of said collar and defining one end of said chamber, a noncircular opening defined in said wall of reduced cross section as compared with the cross section of said chamber, a thrust bar having a noncircular portion adapted to be moved axially through said opening and held in one position of axial alignment therewith and having axial and radial clearance with said chamber in all positions of relative rotation and axial movement, a portion of reduced transverse cross section upon said bar adjacent said noncircular portion and having at least partial rotational clearance with said noncircular portion when disposed in the radial plane thereof, said noncircular portion of said bar upon partial rotation of said reduced portion in the plane of said opening overlapping a portion of said wall defining said opening to transfer the thrust of said bar to said collar, an axial projection on said wall adjacent said opening with which said noncircular portion of said bar engages as a stop on partial rotation in one direction to interlock said collar and bar for unitary rotation.

3. A rapid traverse screw advance pressure unit assembly, as defined in claim 2, wherein said noncircular and reduced portions of said bar are alternately arranged along said bar with said noncircular portion being spaced a distance slightly greater than the distance of said transverse wall at the point of overlapping between said noncircular portion and said wall.

4. A rapid traverse screw advance pressure unit assembly as defined in claim 2 wherein said transverse wall is defined at one end of said collar, and said interlocking stop is defined by a depression in said wall.

HENRY H. MERRIMAN.

REFERENCES CITED

The following references are of record in the file of this patent:

UNITED STATES PATENTS

| Number | Name | Date |
|--------|------|------|
| 986,464 | Jack | Mar. 14, 1911 |
| 823,356 | Oslund | June 12, 1906 |